March 5, 1968 J. R. PUENTE 3,371,922
ADJUSTABLE CLAMP MECHANISM FOR MOLDING FRAMEWORK
Original Filed Feb. 5, 1965 2 Sheets-Sheet 1
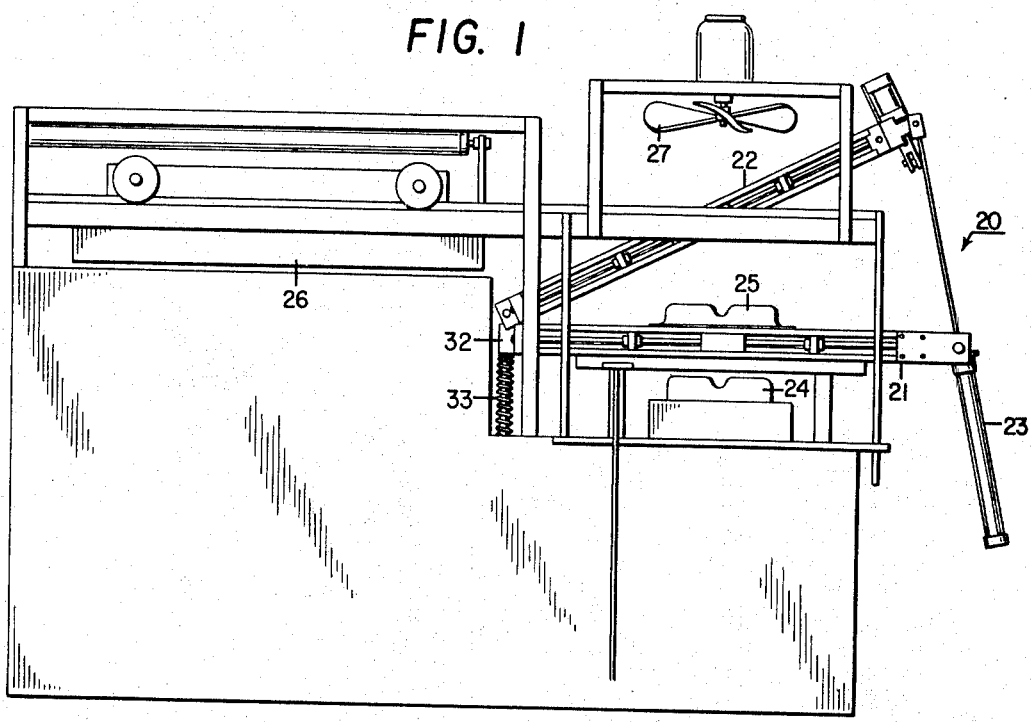
INVENTOR.
JOSE R. PUENTE
BY
HIS ATTORNEYS.

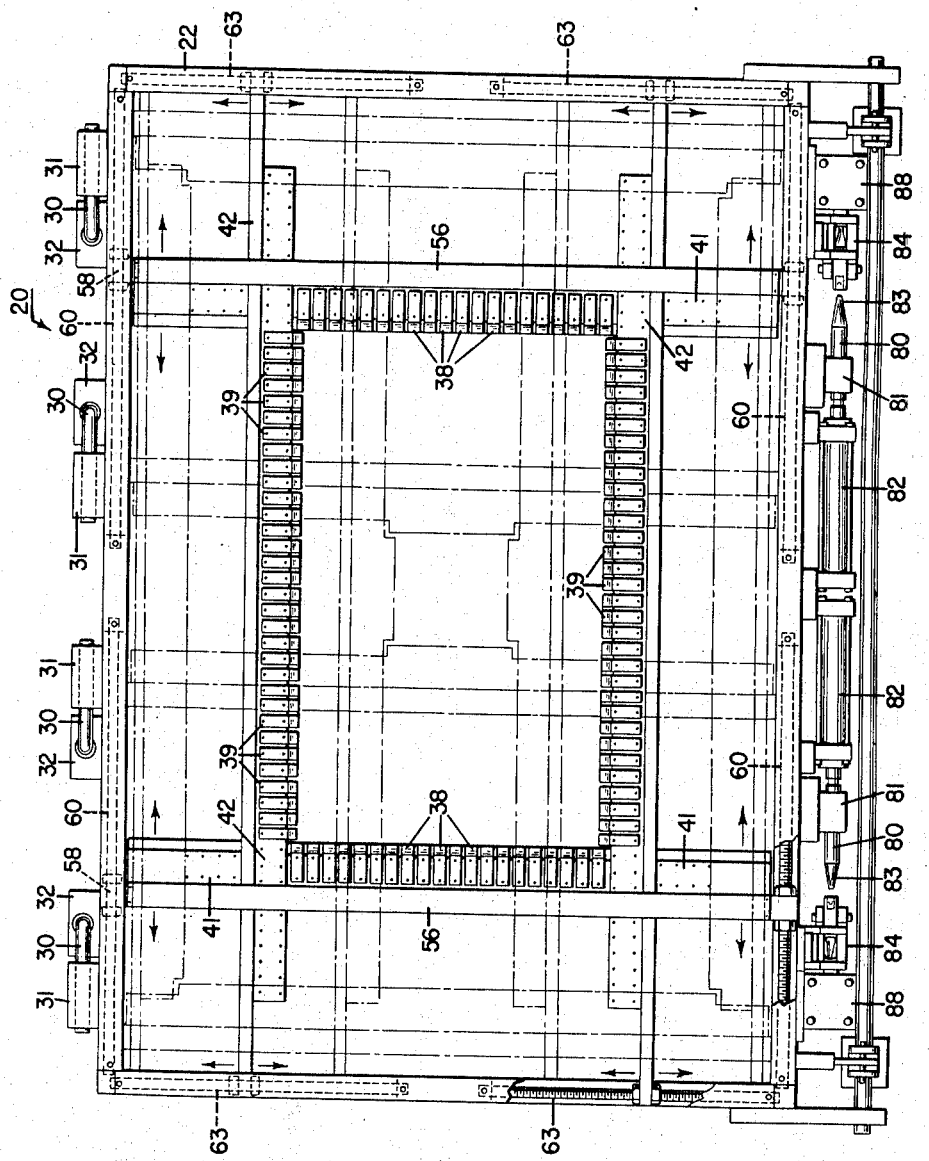

United States Patent Office 3,371,922
Patented Mar. 5, 1968

3,371,922
ADJUSTABLE CLAMP MECHANISM FOR MOLDING FRAMEWORK
Jose R. Puente, Rochester, N.Y., assignor to Leaming Plastics, Inc., Canandaigua, N.Y.
Original application Feb. 5, 1965, Ser. No. 430,638, now Patent No. 3,287,765, dated Nov. 29, 1966. Divided and this application June 30, 1966, Ser. No. 561,913
6 Claims. (Cl. 269—27)

ABSTRACT OF THE DISCLOSURE

A latching mechanism for closing two elements from an ajar position uses a movable latch bar on one element, a latch receiver on the other element, a lever mounted on the latch receiving element, and a powered lever arranged on one of the elements for levering against the latch to force the elements closed. The latch and its receiver are surfaced to cam the elements together as the latch is slid home, and the latch and lever are powered pneumatically. The arrangement is useful in closing normally ajar frames for holding sheets of material for molding operations.

---

This application is a division of my copending parent application Ser. No. 430,638, filed Feb. 5, 1965, entitled, Adjustable Framework for Molding, now Patent No. 3,287,765.

This invention relates to a clamp mechanism for an adjustable framework for molding.

In many molding operations, and especially in vacuum forming operations, a sheet of moldable material, for example, a sheet of thermoplastic material, is supported in a framework. Typically, such a supporting framework is formed of upper and lower frame members that are hingedly connected and that can be opened and closed for inserting a sheet of material and removing the molded object. The molding operations usually include heating if the material to be molded is a thermoplastic and may include movement of either the supporting framework or mold members so that considerable stress is placed upon the sheet held in the framework.

Previous sheet-supporting frameworks for molding operations have been expensive, difficult to repair, and adapted to hold only a single sized sheet. Also, such previous frameworks have not performed well in holding sheets firmly and evenly without either excess or inadequate around the edges of the sheets.

An object of this invention is to overcome the disadvantages of previous sheet-supporting frameworks for molding operations.

Another object of the invention is to support sheets of material for molding operations in an economical and adjustable framework in which the sheets are gripped firmly and evenly around their edges without either cutting into the sheets or letting them slip loose.

Another object of the invention is to grip a sheet of thermoplastic material by even pressure around its periphery within a framework that functions consistently, reliably, and acurately in gripping successive sheets during molding operations.

Another object of the invention is to hold sheets for molding operations by an adjustable framework that is economical to make and repair, convenient and reliable to operate, and easy to adjust for accepting various sized sheets of material.

Another object of the invention is to make a sheet supporting framework having interchangeable, standardized parts that are easily removed and replaced.

Another object of the invention is to make a sheet-supporting framework that automatically grips various thicknesses of sheets with even, predetermined gripping force.

To these and other ends, the invention resides in certain improvements and combinations, all as will be hereinafter more fully described, the novel features being pointed out in the claims at the end of this specification.

In the drawings:

FIG. 1 shows a partially schematic side elevation of an adjustable framework according to the invention as used in a molding operation;

FIG. 2 shows a plan view of an adjustable framework having a clamping mechanism according to the invention; and FIG. 3 shows a fragmentary front elevation of a clamping mechanism according to the invention.

Throughout the drawings, corresponding parts are identified by the same reference numerals.

Generally, the adjustable framework 20 according to the invention includes a lower frame 21 and an upper frame 22 as shown in FIG. 1. Lower frame 21 and upper frame 22 are preferably hingedly connected so that they can be separated to the illustrated open position and brought together to a closed position in which upper frame 22 registers with lower frame 21. Any of a variety of devices can be used for conveniently opening and closing framework 20, but many molding operations include a source of pneumatic power, and for such operations it is preferred that pneumatic power such as schematically illustrated by cylinder 23 be used for separating and closing the upper and lower frames.

Male mold core 24 and female mold cavity 25 are shown arranged in the vicinity of framework 20 for molding operations. A heating element 26 is shown mounted on rails for transverse movement over framework 20 and for withdrawal to the retracted position as illustrated in FIG. 1. Fan 27 is arranged for cooling the molded article preparatory to its withdrawal from the mold.

The adjustable framework according to the invention is suitable for use in many molding operations and can be applied to holding of sheets for other purposes, so that it is not limited to use with the illustrated molding operations. Thus, vacuum forming and other molding operations can be carried on in cooperation with an adjustable sheet-holding framework according to the invention.

The hinged connection between upper frame 22 and lower frame 21 is best shown in FIGS. 1 and 2. Hinge rods 30 are pivotally housed in blocks 31 that are fixed to upper frame 22, and are mounted for vertical sliding in blocks 32 fixed to lower frame 21. Springs 33 (FIG. 1) are compressed between the ends of hinge rods 30 and blocks 32 so as to urge blocks 31 and upper frame 22 forcefully down against lower frame 21 to eliminate any looseness or play between upper frame 22 and lower frame 21 caused by wear or adjustment of the hinge interconnecting them. Upper frame 22 and lower frame 21 are thus held together along their back edges by a predetermined bias or force exerted by springs 33. Of course, the mounting of hinge rods 30 can be reversed relative to the upper and lower frames and still accomplish a similar result.

Upper frame 22 is pulled downward under the influence of springs 33 as the framework is opened and upper frame 22 is raised upward away from lower frame 21. As the front edges of the upper and lower frames are drawn forcefully together from an ajar position to a closed position, springs 33 are compressed to urge upper frame 22 downward against lower frame 21.

Upper frame 22 and lower frame 21 are adapted to clamp a sheet of material for molding between themselves when brought to their closed position. To this end, one half of a clamping element is arranged on upper frame 22 and the other corresponding half of such clamping element is arranged on lower frame 21, and a sheet of material for molding is gripped between the two halves of the clamping element when frames 22 and 21 are forced closed from an ajar position.

A complete array of clamping fingers 38 and 39 as arranged on supporting bars 41 and 42 is best shown in FIG. 2. Preferably a great plurality of closely spaced clamping fingers is arranged around the periphery of the sheet of material to be held, so that the material is closely gripped around substantially all of its periphery. The individual spring bias of each clamping finger insures that such peripheral gripping is even and uniform.

Sheet size adjustments can be made to support members 41 and 42 carrying clamping fingers 38 and 39 respectively. An upper bar 56 is spaced above support bar 41 throughout most of its length and connected at its ends by end plates 58 each of which has a bore hole for receiving threaded rods 60. By loosening set nuts, support bars 41 can be moved transversely of frame 22 to any desired position within the extent of threaded rods 60.

Support member 42 is preferably in the form of an angle piece dimensioned to fit closely into the space between upper bar 56 and support member 41 so as to be slidable within such space relative to support member 41. The upright portion of support member 42 is provided with a bore at its ends for receiving screw-threaded rods 63 arranged along the sides of upper frame 22. In a manner similar to that described above, set nuts can be loosened to allow forward and back adjustment of support members 42 on screw-threaded rods 63.

It is important for the proper functioning of the clamping fingers and the supporting plates in evenly gripping a sheet of material that upper frame 22 and lower frame 21 be forced closed from any ajar position. Any spacing apart of upper frame 22 and lower frame 21 would reduce the gripping force of clamping fingers 38 and 39, and if such space were at one edge of the framework, the gripped sheet might come loose during the molding operations.

The spring biasing of the back edge of frame 22 against frame 21 at the point of their hinged interconnection has been described above. To insure that upper frame 22 is closed relative to lower frame 21 and not ajar it is important that the front or opposite edges of the frames also be drawn closed together. As best shown in FIGS. 2 and 3, a clamping or latching mechanism according to the invention cooperates with the adjustable sheet clamping means of the upper and lower frames by forcing the frames closed.

A slidable latch bar 80 is supported in a bearing block 81 that is preferably mounted on lower frame 21. Bar 80 is moveable in a reciprocal sliding motion, and is preferably driven by pneumatic means 82. Slide bar 80 is normally retracted to the broken line position illustrated in FIG. 3 and preferably is movable in the direction of the arrow in response to lowering of upper frame 22 down over lower frame 21.

Bar 80 is arranged to be driven by pneumatic means 82 in the direction of the arrow into a latch means 84 arranged on upper frame 22. Latch means 84 has an opening or socket 86 that preferably includes a cammed ramp 85 adapted to be engaged by the preferably tapered end 83 of bar 80 as it is driven into socket 86. The driving engagement of tapered end 83 of bar 80 against ramp 85 is such as to cam upper frame 22 downward toward lower frame 21 as bar 80 is driven into socket 86.

Driving of bar 80 home into socket 86 actuates microswitch 87 to energize pneumatic driving means 88. Energization of pneumatic means 88 forces rod 89 downward into engagement with lever 90 that is pivoted about axle 91 that is supported on upper frame 22 by means of an extension of the latch member 84.

Downward thrust of rod 89 on the lever end 93 of lever 90 forces bearing plate 92 on the bearing end of lever 90 upward into engagement with bar 80 in its latched position. Bar 80 thus acts as a fulcrum by which upper frame 22 is driven closed together with lower frame 21 through the levering of lever 90 against axle 91 connected to upper frame 22. It is preferred that the lever arm 93 of lever 90 be longer than the bearing arm of lever 90 so that a mechanical advantage is obtained from the force of pneumatic means 88 in driving the upper and lower frames together. Also, it is preferred that at least a pair of latching or clamping devices including bars 80 and levers 90 be arranged at the front edge of each framework according to the invention.

Of course, any members illustrated as arranged on the upper or lower frame can be inversed according to the invention, and the entire framework could be oriented on its side or edge, so that "upper" and "lower" refer only to the illustrated embodiment of the invention.

It can be seen that the invention accomplishes its stated objects in providing a simple, reliable and easily adjustable framework for evenly gripping sheets of material of various sizes and thicknesses.

While the invention has been disclosed herein by reference to the details of a preferred embodiment, it is to be understood that such disclosure is intended in an illustrative rather than a limiting sense, and it is contemplated that various modifications of the construction and arrangement of the parts will readily occur to those skilled in the art within the spirit of the invention and the scope of the appended claims.

I claim:
1. In a structure comprising two elements relatively movable in an opening direction from an ajar position, means operable when said elements are in said ajar position for clamping said elements together in a closed position, said clamping means comprising:
   (a) latch means carried by a first one of said elements and comprising a member movable into a latching position;
   (b) latch receiving means carried by a second one of said elements for engaging said movable member in said latching position;
   (c) lever means comprising a lever pivotally mounted on said second one of said elements for bearing against said movable latch member in said latching position; and
   (d) means carried by one of said elements for levering said lever against said movable latch member in a direction generally opposite to said opening direction to urge said elements closer together.

2. The structure of claim 1 wherein said movable latch member comprises a latch bar slidable transversely to said opening direction.

3. The structure of claim 2 including a ramp means arranged in the region of said engagement between said movable latch member and said latch receiving means for camming said elements closer together as said latch bar is slid into engagement with said latch receiving means.

4. A structure according to claim 3, wherein said elements comprise a pair of separable frames arranged in said ajar position so that one frame overlies the other frame and said frames are established and maintained in said closed position by said clamping means.

5. A structure according to claim 4, wherein each of said frames has oppositely disposed edges with spring biased, hinge connection means hingedly connecting one of said edges of one of said frames to the corresponding one of said edges of the other of said frames, said latch bar means are carried by a first one of said frames in the region of the other of said edges and said latch receiving means are carried by a second one of said frames in the region of the other of said edges.

6. A structure according to claim 5, wherein said latch bar means comprise pneumatic means for sliding said latch bar in and out of said latching position and said levering means comprise pneumatic means for applying and removing said leverage to and from said lever.

References Cited

UNITED STATES PATENTS 1,733,128  10/1929  Mavborgne.
2,786,701   3/1957  Povlich _____ 292—144

LESTER M. SWINGLE, *Primary Examiner.*

J. F. McKEOWN, *Assistant Examiner.*